(12) United States Patent
Eichhorn (10) Patent No.: US 7,787,674 B2
(45) Date of Patent: Aug. 31, 2010

(54) SYSTEMS AND METHODS FOR VIEWING THREE DIMENSIONAL VIRTUAL SLIDES

(75) Inventor: Ole Eichhorn, Westlake Village, CA (US)

(73) Assignee: Aperio Technologies, Incorporated, Vista, CA (US)

( * ) Notice: Subject to any disclaimer, the term of this patent is extended or adjusted under 35 U.S.C. 154(b) by 396 days.

(21) Appl. No.: 11/341,097

(22) Filed: Jan. 27, 2006

(65) Prior Publication Data

US 2006/0171582 A1      Aug. 3, 2006

Related U.S. Application Data

(60) Provisional application No. 60/647,542, filed on Jan. 27, 2005.

(51) Int. Cl.
*G06K 9/00* (2006.01)
(52) U.S. Cl. .................................... 382/128; 382/154
(58) Field of Classification Search ................ 382/128, 382/133, 154, 284
See application file for complete search history.

(56) References Cited

U.S. PATENT DOCUMENTS

| | | | |
|---|---|---|---|
| 3,643,015 A | 2/1972 | Davidovits, et al. | |
| 4,673,988 A | 6/1987 | Jansson et al. | |
| 4,700,298 A | 10/1987 | Palcic et al. | |
| 4,742,558 A | 5/1988 | Ishibashi et al. | |
| 4,744,642 A | 5/1988 | Yoshinaga et al. | |
| 4,760,385 A | 7/1988 | Jansson et al. | |
| 4,777,525 A | 10/1988 | Preston et al | |
| 4,845,552 A | 7/1989 | Jaggi et al. | |
| 4,960,999 A | 10/1990 | McKean et al. | |
| 5,086,477 A | 2/1992 | Yu et al. | |
| 5,187,754 A | 2/1993 | Currin et al. | |
| 5,231,663 A | 7/1993 | Earl et al. | |
| 5,400,145 A | 3/1995 | Suita et al. | |

(Continued)

FOREIGN PATENT DOCUMENTS

EP      0 339 582      4/1998

(Continued)

OTHER PUBLICATIONS

Hamilton, Eric, "JPEG File Interchange Format" Version 1.02, Sep. 1, 1992; C-Cube Microsystem, Milpitas, CA.

(Continued)

*Primary Examiner*—Brian Q Le
(74) *Attorney, Agent, or Firm*—Pattric J. Rawlins; Procoio Cory Hargreaves & Savitch LLP (57) ABSTRACT

Systems and methods for retrieving, manipulating, and viewing 3D image objects from 3D virtual microscope slide images are provided. An image library module provides access to the imagery data in a 3D virtual slide and constructs 3D image objects that are coextensive with the 3D virtual slide or a 3D sub-portion thereof. From within the 3D image object, cross layer planar views spanning various depths of the 3D virtual slide are constructed as well as 3D prisms and other shaped image areas. The image library module allows a 3D image object to be sliced into horizontal and vertical views, skewed cross layer views and regular and irregular shaped 3D image areas for viewing by a user.

9 Claims, 8 Drawing Sheets

U.S. PATENT DOCUMENTS

| | | |
|---|---|---|
| 5,412,214 A | 5/1995 | Suzuki et al. |
| 5,495,535 A | 2/1996 | Smilansky et al. |
| 5,578,832 A | 11/1996 | Trulson et al. |
| 5,633,948 A | 5/1997 | Kegelmeyer, Jr. |
| 5,644,356 A | 7/1997 | Swinson et al. |
| 5,672,861 A | 9/1997 | Fairley et al. |
| 5,710,835 A | 1/1998 | Bradley |
| 5,714,756 A | 2/1998 | Park et al. |
| 5,790,710 A | 8/1998 | Price et al. |
| 5,793,969 A | 8/1998 | Kamentsky et al. |
| 5,796,861 A | 8/1998 | Vogt |
| 5,834,758 A | 11/1998 | Trulson et al. |
| 5,872,591 A | 2/1999 | Truc et al. |
| 5,912,699 A | 6/1999 | Hayenga et al. |
| 5,922,282 A | 7/1999 | Ledley |
| 5,943,122 A | 8/1999 | Holmes |
| 5,963,314 A | 10/1999 | Worster et al. |
| 5,968,731 A | 10/1999 | Layne et al. |
| 5,991,444 A | 11/1999 | Burt et al. |
| 5,999,662 A | 12/1999 | Burt et al. |
| 6,002,789 A | 12/1999 | Olsztyn et al. |
| 6,005,964 A | 12/1999 | Reid et al. |
| 6,049,421 A | 4/2000 | Raz et al. |
| 6,078,681 A | 6/2000 | Silver |
| 6,091,846 A | 7/2000 | Lin et al. |
| 6,101,265 A | 8/2000 | Bacus et al. |
| 6,272,235 B1 | 8/2001 | Bacus et al. |
| 6,327,377 B1 | 12/2001 | Rutenberg et al. |
| 6,330,348 B1 | 12/2001 | Kerschmann et al. |
| 6,438,268 B1 | 8/2002 | Cockshott et al. |
| 6,519,357 B2 | 2/2003 | Takeuchi |
| 6,640,014 B1 * | 10/2003 | Price et al. ............... 382/255 |
| 6,711,283 B1 | 3/2004 | Soenksen |
| 6,714,281 B1 | 3/2004 | Amano et al. |
| 7,027,628 B1 * | 4/2006 | Gagnon et al. ............ 382/128 |
| 7,492,967 B2 * | 2/2009 | Toki et al. ............... 382/299 |
| 2004/0236773 A1 * | 11/2004 | Bacus et al. ............. 707/100 |
| 2005/0063611 A1 * | 3/2005 | Toki et al. ............... 382/299 |
| 2005/0089208 A1 * | 4/2005 | Dong et al. .............. 382/133 |

FOREIGN PATENT DOCUMENTS

| | | |
|---|---|---|
| EP | 0 871 052 | 10/1998 |
| WO | 98/39728 | 9/1998 |
| WO | 98/44446 | 10/1998 |

OTHER PUBLICATIONS

Adobe Developers Association, "TIFF "Revision 6.0, Jun. 3, 1992; Adobe Systems Incorporated, Mountain View, CA.

* cited by examiner

SYSTEMS AND METHODS FOR VIEWING THREE DIMENSIONAL VIRTUAL SLIDES

RELATED APPLICATION

The present application claims priority to U.S. provisional patent application Ser. No. 60/647,542 filed on Jan. 27, 2005, and is related to U.S. patent application Ser. No. 11/140,265, each of which is incorporated herein by reference in its entirety.

BACKGROUND

1. Field of the Invention

The present invention generally relates to virtual microscopy and more particularly relates to retrieval, manipulation, and viewing of three dimensional image objects from three dimensional virtual microscope slide images.

2. Related Art

Conventional microscopes, using mechanical focusing mechanisms of sufficient quality, are easily focused by an observer. The feedback loop between the eye/brain and the fingers is extremely rapid and accurate. If any part of the feedback loop is impaired, however, the process of obtaining perfect focus becomes extremely difficult, time consuming and even inaccurate. These impairments may arise from poor optical quality, insufficient or incorrect illumination, inaccuracies in the focusing mechanism, or even due to poor visual acuity of the operator.

More recently, conventional computer implemented microscope systems have provided the ability to remotely access high resolution images of microscope slides for a number of years. Devices capable of creating such images fall into two broad categories: (1) remote controlled (or robotic) microscopes; and (2) imagers, which create some type of electronic or photographic image of some, or all, of the specimen. Each type has its advantages and disadvantages, many of which are unique to the particular application.

Conventional imaging systems are capable of creating large enough images to capture an entire specimen at moderate or high magnification. These images are called virtual microscope slides or virtual slides. Because of their extremely large size, virtual slides are usually limited to a single focus level ("z-plane"). Many types of microscope specimens are very thin so a single z-plane virtual slide is sufficient. Other types of microscope specimens, however, are thicker than the depth of field of the objective lens.

Recent improvements in imaging systems include the ability to create virtual slides with multiple z-planes. These virtual slide images are called three dimensional ("3D") virtual slides and include imagery data from multiple focus levels throughout the thickness of the microscope specimen. What is needed is a system and method for extracting three dimensional image objects from the image data in a three dimensional virtual slide for viewing by a user.

SUMMARY

Accordingly, the present invention provides systems and methods for retrieving, manipulating, and viewing 3D image objects from 3D virtual microscope slide images. An image library module provides access to the imagery data in a 3D virtual slide and constructs 3D image objects that are coextensive with the 3D virtual slide or a 3D sub-portion thereof. From within the 3D image object, cross layer planar views spanning various depths of the 3D virtual slide are constructed as well as 3D prisms and other shaped image areas. The image library module allows a 3D image object to be sliced into horizontal and vertical views, skewed cross layer views and regular and irregular shaped 3D image areas for viewing by a user.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for systems and methods for retrieving, manipulating, and viewing 3D image objects from 3D virtual microscope slide images.

For example, one method as disclosed herein allows for a 3D image object to be obtained from a 3D virtual slide and the 3D image object can be rotated, flipped, and sliced to provide a user with a complete 3D interrogation of a tissue sample.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Introduction

In one embodiment of virtual slide viewing, an image library module may provide access to a virtual slide image object. The image library module may be a programmed or programmable object implemented in software, hardware, or some combination of the two. For example, the image library module may encapsulate access to a virtual slide. Accordingly, all access to a virtual slide may go through this module, either locally (access to disk files) or remotely (access to an image server machine). An image server may even use the image library module to access disk files. Virtual slides can contain 3D data, in which multiple image planes are provided at a series of Z values. These multiple image planes may occur over an entire scanned tissue area, or selected regions may be captured in this way.

Image data that results from multi-planar acquisition is truly three dimensional. It can be perceived as a three dimensional solid which is divided up into cubical pixels. Image planes that were not physically captured can be synthesized between captured image planes using interpolation, in the same way that the resolution in X or Y can be increased by bilinear or bicubic sampling.

In one embodiment, the image library module employs the central concept of a "view". A view is a two-dimensional rectangular region derived from the image object. The image object may be the entire 3D virtual slide or some portion thereof. Software that wishes to display or process data from an image object retrieves data from the object as a view. For example, various view parameters are established and provided to the image library module that in response retrieves and provides the view.

For two dimensional image objects all views are co-planar with the image object's plane. A view may begin at any X,Y location in the image object, have any desired dimensions (width and height), and may be scaled to any desired resolution ("zooming"). Views can also be rotated relative to the original image.

Even for three dimensional image objects, a view remains two-dimensional and corresponds to a slice through a three dimensional space. The simplest possible case is that two-dimensional views are perpendicular to the Z axis of the image object. In this case views may begin at any X,Y location in the image object, have any desired dimension (width and height), and may be scaled to any desired resolution ("zooming"). In addition the view's plane may be located at any desired location along the Z axis ("focusing").

More complicated cases arise when the view plane is not perpendicular to the Z axis. For example, arbitrary orientation for views can be provided, thus enabling full 3D viewing. Additionally, orthogonal transformations (rotations and flips) enable "side views" and other interesting capabilities. The ability to tilt a view slightly from the Z-axis can provide a "parallax" effect. Note that regardless of the view orientation, there is always an axis perpendicular to the view, and the view plane may be located at any desired point along this axis ("focusing" can be performed along axes other than Z). To support 3-D image objects, the image library module may provide a well defined application programming interface ("API") that extends a number of features and functionality to applications that include the module.

Images have attributes that are determined at acquisition time and can be queried via the API. Among these attributes are overall width (X) and height (Y). Three dimensional image objects also have depth (Z). For consistency the units of depth are pixels, even though these don't have a physical dimension when an image is acquired. The resolution of an image object may also be retrieved in order to convert pixel dimensions to physical units such as microns. For practical reasons image objects may have various resolutions pre-rendered, either by acquisition through different power objective lenses or through interpolation.

The image library module enables the attributes of each physical image (width, height, zoom relative to base) to be queried. Three dimensional image objects may have multiple z-planes pre-rendered (e.g., corresponding to the actual planes which were captured). The characteristics of these z-planes (width, height, zoom relative to base, and Z-location) can also be queried.

A view has attributes that can be modified through the image library module. These attributes include X and Y offsets and width and height, expressed in pixels relative to the current view resolution, and zoom, expressed as a floating point scale value. Views of 3D image objects also have a focus attribute, expressed as a signed floating point value. In one embodiment, a zero value for focus can be the center of the image object, and the focus values can range from −1 to +1, with negative values designating planes closer in the view direction.

In addition to two-dimensional views through the 3D image object, it may also be useful to retrieve regular and irregular shapes such as prisms and polygons from a 3D image object. These shapes are three-dimensional views. In one embodiment, a prism can have all the attributes of a view, and additionally has a specified depth. As with image objects, prisms can be thought of as having cubic pixels, oriented to the view axis which defines the prisms' orientation.

A clarification regarding the term "depth" as applied to images will be helpful at this juncture. In conventional terminology, images have a property called bits-per-pixel. This is sometimes referred to as "color depth." Color depth is not the same as the "image depth" attribute of 3D images. Bits-per-pixel is a much more accurate term than "color depth" but both terms are used interchangeably by workers in the field of digital imaging. The color depth (bits-per-pixel) determines the precision with which color values are stored. For example, with respect to color virtual slides, usually 24 bits per pixel are stored, namely 8 bits for each of the red, green, and blue color channels. Each pixel therefore requires 3 bytes.

3D objects have depth (Z), as well as lateral extent (X,Y). The "image depth" is the number of pixels in the Z-direction and corresponds to the overall change in the Z value. As an example, if we scan 10 z-planes at 40.times., each plane separated from each other by 1 micron, then the "image depth" is about 40 pixels, since there are about 4 pixels per micron. Note that there are 10 planes, but that the depth is 40 pixels. This is because the Z-sampling is coarser than the lateral (X,Y) pixel sampling of each image plane.

A 3D image object comprises one or more layers in the Z direction. Each layer may have depth ("thickness"), since it may be composed of multiple planes; if a layer is composed of a single plane, then it has a depth of 1 pixel. Each plane may in turn be composed of one or more co-planar images.

Image objects may also be blocked. If they are, blocks are identified by X-offset and Y-offset within a layer. It is possible for some layers to be blocked while others are not. If a layer is blocked, then all planes within that layer will have the same blocking offsets. However, each layer need not have the same blocking offsets as other layers. In one embodiment, each of the blocks within a layer has the same depth.

Note that an image object is the entire 3D collection of images and may be an entire virtual slide or a portion of a virtual slide. Additionally, a single image may be a portion of one layer of an image object. In alternative embodiments, a virtual slide may be a single file that contains multiple images or a collection of individual files that each comprise one image.

In one embodiment, the preferred file format used for storing 2D virtual slides allows for compression, in order to reduce file size. This compression methodology can be extended to 3D image objects as well, resulting in a substantial saving of disk space and a corresponding improvement in the performance of remote viewing. In 3D compression, there is also the ability to store a 3D image or section of a 3D image in one disk file (e.g., using a multi-image disk file format such as TIFF). In such a case, output blocks are formed which have depth, the disk file will have a single layer, and each block in the layer will have depth. Advantageously, both 2D and 3D compression methods allow for block-type compression, so that contiguous regions of image data can be retrieved efficiently by accessing only those blocks that are in common with the spatial region being retrieved.

Generally, when accessing and viewing image information, "full resolution" denotes the resolution at which the data were acquired. At 40×, using a typical acquisition device such as the Aperio ScanScope®, this corresponds approximately to 0.25 microns per pixel. When viewing it is often useful to zoom to lower resolutions. In order to facilitate zooming rapidly, sub-sampled versions of an image object can be created and stored. These sub-sampled images may be stored as part of the image object. For a 3D image object each layer may be sub-sampled. Thus, a virtual slide image file may contain multiple images for each layer, at varying resolutions.

It is advantageous to have the whole 3D image object in one file because it simplifies moving it around, renaming it, etc. It is also advantageous to use a standard TIFF file format for a 3D image object because it is standard and it is easy to implement through use of the existing libtiff module, which works very well. One limitation, however, to using a single TIFF file is the 4 GB size limit. Since virtual slides typically use lossy compression this size limit is usually not an issue for 2D images, but 3D image object can be significantly larger.

As will be understood by those having skill in the art, there are a variety of ways to address the 4 GB size limit for TIFF files. For example, a single virtual slide file can be made bigger than 4 GB if a file format other than TIFF is used. Alternatively, image objects can be stored as multiple files. The multiple file approach may be preferable because it can be made backward compatible with techniques already in use and files larger than 4 GB have other inherent problems, for example, they exceed the size of a digital versatile disc ("DVD").

DESCRIPTION OF THE FIGURES

Figure 1:
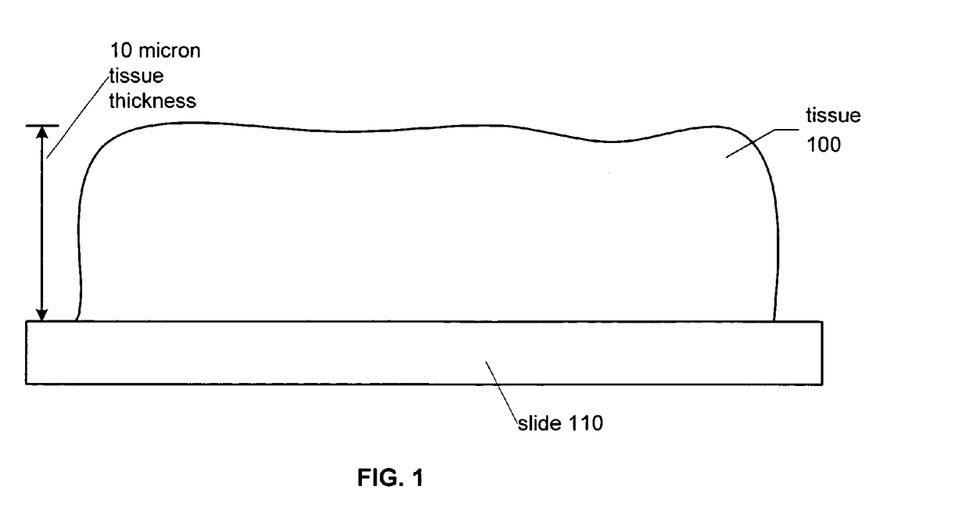
FIG. 1 is a block diagram illustrating an example side view of a microscope slide and specimen according to an embodiment of the present invention.

FIG. 1 is a block diagram illustrating an example side view of a microscope slide 100 and specimen according to an embodiment of the present invention. In the illustrated embodiment, the slide 110 supports a sample of tissue 100 (also referred to herein as a specimen). The tissue 100 may be any type of microscope slide specimen such as blood or other substances.

Although tissue samples such as tissue 100 on a microscope slide appear flat, at the micron and sub-micron resolution level they may actually have a considerable amount of thickness. The thickness of samples can vary from 0.5 micron to 10 microns. To digitally capture medically important information on a thick specimen, an objective lens is focused through the specimen at varying focal depths. At each focal depth, an image plane is captured, for example, an area of a specimen that is 10 microns thick may have 10 separate image planes. Because the thickness of the tissue 100 may not be uniform across the slide 110, sets of image planes may be acquired from various locations on the specimen. Each individual image plane corresponding to a thick region of the specimen is called a "z-plane."

Figure 2:
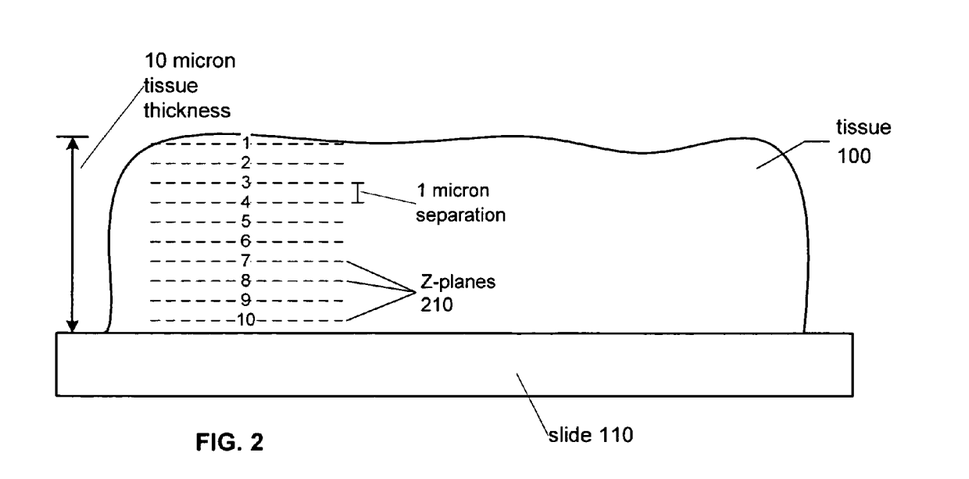
FIG. 2 is a block diagram illustrating an example side view of a microscope slide and specimen with z-planes according to an embodiment of the present invention.

FIG. 2 is a block diagram illustrating an example side view of a microscope slide 110 and tissue specimen 100 with z-planes 210 according to an embodiment of the present invention. In the illustrated embodiment, the z-planes 210 are identified at a location on the specimen that is 10 microns thick. As will be understood, the tissue 100 may have a relatively uniform thickness or may have peaks and valleys. In the illustrated embodiment, there are 10 z-planes 210. In this particular embodiment, the focus depth of the objective lens is 1 micron so that 10 contiguous Z-planes are captured with a 1 micron separation between each z-plane and collectively cover the entire 10 micron thickness of the specimen. In alternative embodiments, the depth of a single Z-plane may be more or less than 1 micron and the various z-planes maybe be spaced apart rather than being contiguous.

The lateral (X,Y) dimensions of each z-plane image can be determined by the acquisition hardware, such as the size of a camera's CCD array. In one embodiment the dimensions of the CCD array may be 2048×1536 pixels. A z-plane image may also be a combination of several fields of view combined together. The number and spacing of the z-plane images are configurable, and may be optimized according to the sample type and nature of the medical application. In one embodiment, a typical three dimensional virtual slide 5-10 z-plane images spaced 0.25-1.0 micron apart.

Figure 3A:
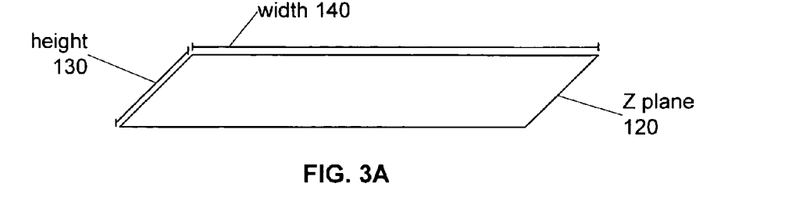
FIG. 3A is a block diagram illustrating an example z-plane according to an embodiment of the present invention.

FIG. 3A is a block diagram illustrating an example z-plane 120 according to an embodiment of the present invention. In the illustrated embodiment, the z-plane 120 has a height 130 and a width 140. A z-plane 120 may cover the entire planar area of a virtual slide or it may cover a portion of a virtual slide image.

Figure 3B:
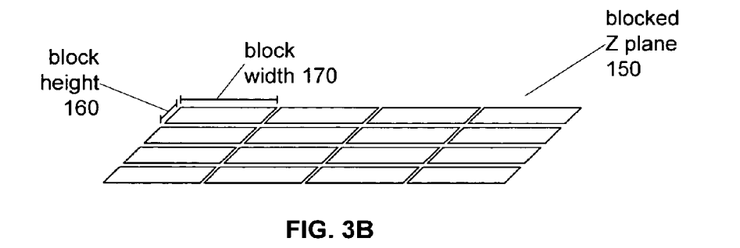
FIG. 3B is a block diagram illustrating an example blocked z-plane according to an embodiment of the present invention.

FIG. 3B is a block diagram illustrating an example blocked z-plane 150 according to an embodiment of the present invention. In the illustrated embodiment, each block of the blocked z-plane 150 has a block height 160 and a block width 170. In one embodiment, all blocks in blocked z-plane 150 have the same block height 160 and the same block width 170. Advantageously, each block in a blocked z-plane 150 may be a separately captured image or it may be an image area cut from the larger z-plane and stored as an individual block or compressed as an individual block. In one embodiment, the various blocks of a blocked z-plane 150 are stored in a single file.

Figure 4A:
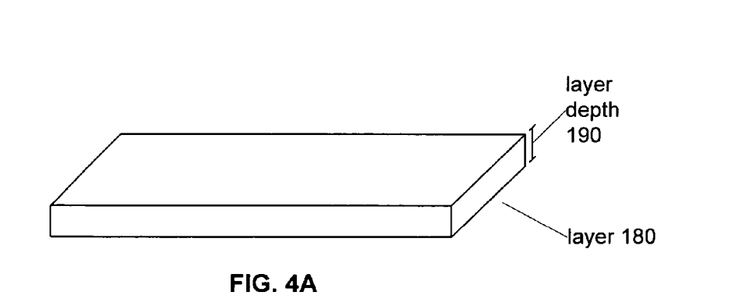
FIG. 4A is a block diagram illustrating an example layer according to an embodiment of the present invention.

FIG. 4A is a block diagram illustrating an example layer 180 according to an embodiment of the present invention. In the illustrated embodiment, the layer 180 may comprise a series of contiguous z-planes, providing the layer with a layer depth 190. The layer 180 also has a height (not shown) and a width (not shown). Each of the contiguous z-planes may have been separately captured by an image acquisition device, or alternatively some or all of the contiguous z-planes may have been interpolated from a z-plane image that was captured by an image acquisition device.

Figure 4B:
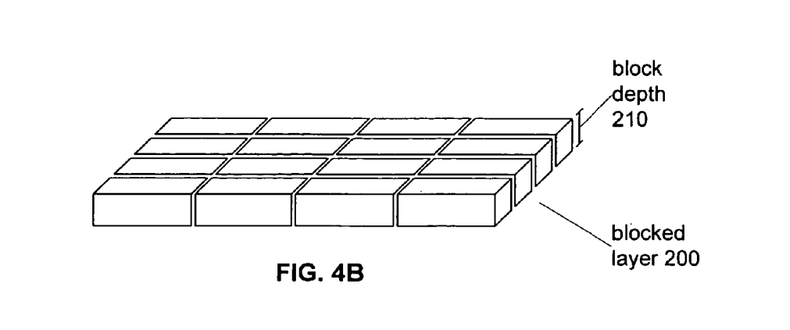
FIG. 4B is a block diagram illustrating an example blocked layer according to an embodiment of the present invention.

FIG. 4B is a block diagram illustrating an example blocked layer 200 according to an embodiment of the present invention. In the illustrated embodiment, each block of the blocked layer 200 has a block depth 210. Each block also has a block height (not shown) and a block width (not shown). In one embodiment, all blocks in blocked layer 200 have the same block height, the same block width, and the same block depth 210. As with the blocked plane, a block in the blocked layer 200 may be a combination of separately captured contiguous images. Alternatively, a block may be a prism cut from the larger layer and stored as an individual block or compressed as an individual block. In one embodiment, the various blocks of a blocked layer 200 are stored in a single file.

Notably, with respect to FIGS. 3A, 3B, 4A and 4B, the various planes and blocked planes and layers and blocked layers may be physical attributes of an image stored in single file or stored in multiple files. Alternatively the various planes and blocked planes and layers and blocked layers may be logical attributes of an image stored in single file or stored in multiple files. Alternative ways to physically or logically arrange and store the image data of a virtual slide will be understood by those having skill in the art and are contemplated for use with the present invention.

Figure 5:
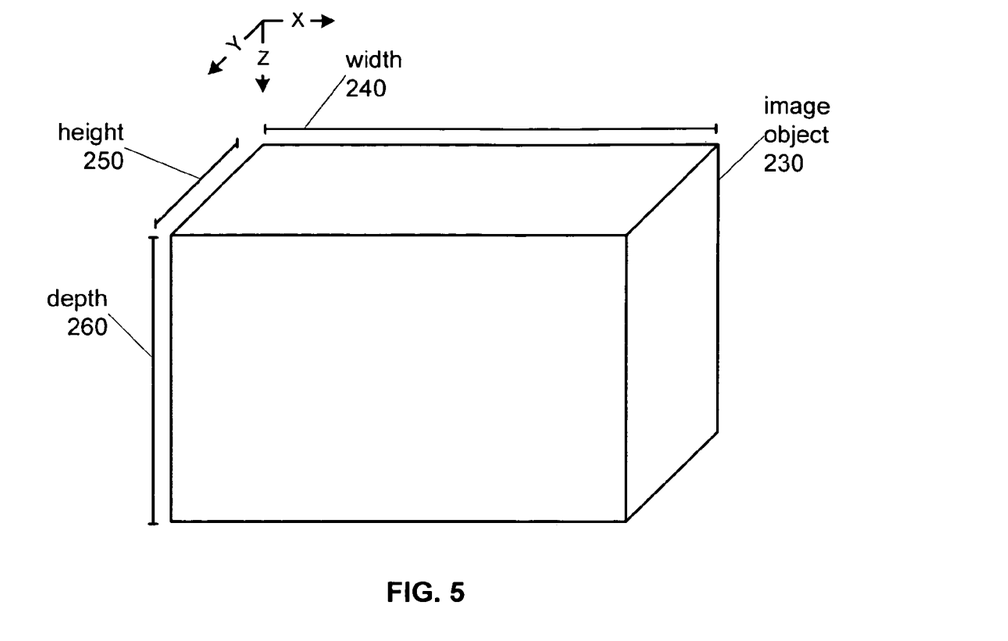
FIG. 5 is a block diagram illustrating an example image object according to an embodiment of the present invention.

FIG. 5 is a block diagram illustrating an example image object 230 according to an embodiment of the present invention. In the illustrated embodiment, the image object 230 has a width 240, a height 250, and a depth 260. The image object 230 may be an entire virtual slide or may be a portion of a virtual slide. The image object 230 may be filled with contiguous image data or it may include various planes and layers of image data that are not contiguous and therefore define empty space between them.

In one embodiment, an image object 230 is defined by its location in an X, Y, and Z coordinate system for a 3D virtual slide. The X, Y, and Z values can provide an initial offset for a first corner of the image object 230. The shape and size of the resulting image object 230 may then be determined by its height 250, width 250 and depth 260 values. Accordingly, the image data for the complete image object 230 may then be obtained from the 3D virtual slide from actual scanned z-planes alone or in combination with interpolations of scanned z-planes to fill in the space between.

Alternative methods for defining the shape and size of an image object 230 may also be employed. Advantageously, an image object 230 may be spherical or irregularly shaped and defined by appropriate equations, as will be understood by those skilled in the art. For example, an image object 230 may be coextensive with a single cell in the tissue sample or some other region of interest so as to provide a user with a 3D image of just the targeted region that can then be rotated and sliced for thorough interrogation.

Figure 6:
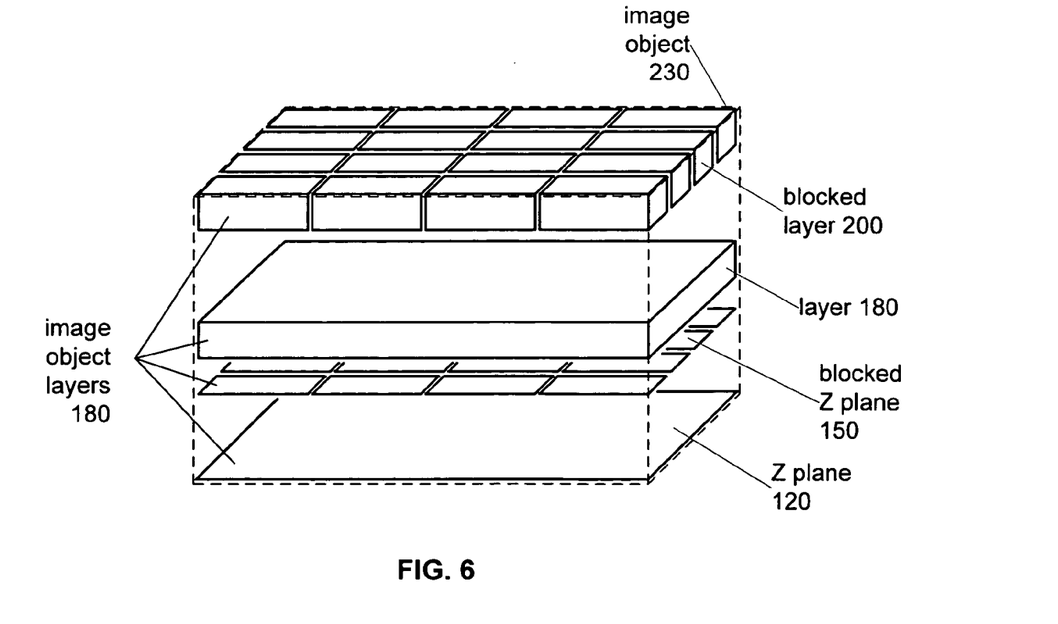
FIG. 6 is a block diagram illustrating example image object layers according to an embodiment of the present invention.

FIG. 6 is a block diagram illustrating example image object layers 180 according to an embodiment of the present invention. In the illustrated embodiment, the layers 180 of image object 230 include a z-plane 120, a blocked z-plane 150, a layer 180, and a blocked layer 200. Advantageously, an image object 230 may include complete contiguous image data in a series of contiguous z-planes that collectively make up a single layer that is co-extensive with the top surface of the image object 230 and the bottom surface of the image object 230.

In an alternative embodiment, the image object 230 (as stored in memory) may only include a single z-plane. When such an image object 230 is retrieved for viewing (e.g., by the image library module), the missing imagery data can be interpolated from a single plane of image data in the virtual slide or between two planes of image data in the virtual slide in order to fill in the missing image information in the image object 230. An advantage of capturing non-contiguous z-planes of image data for a 3D virtual slide is that the resulting size of the single file virtual slide image is significantly reduced.

Figure 7A:
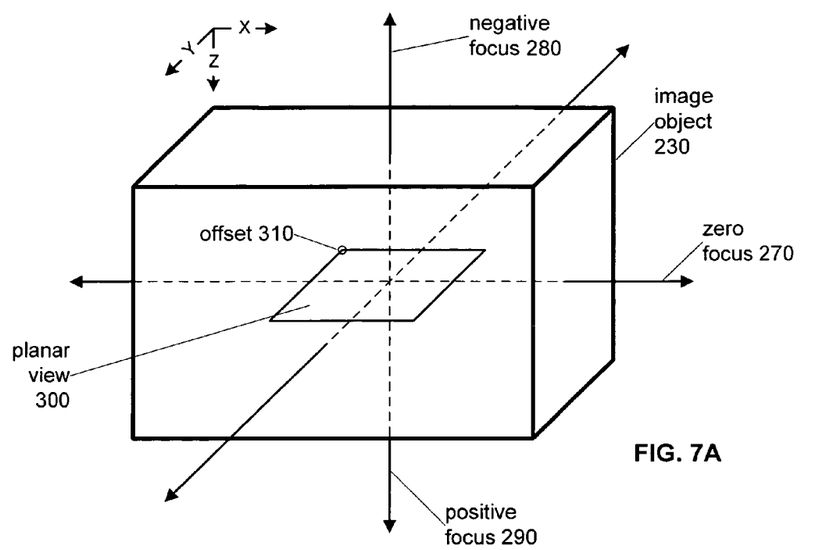
FIG. 7A is a block diagram illustrating an example image object and planar view according to an embodiment of the present invention.

FIG. 7A is a block diagram illustrating an example image object 230 and a planar view 300 according to an embodiment of the present invention. In the illustrated embodiment, the image object 230 may be logically oriented to a 3D coordinate system that includes a zero focus 270 plane that extends through the center of the image object 230. In one embodiment, the focus of the image object 230 is in the range of −1 to +1, with negative focus 280 values designating planes closer to the objective lens during image capture and positive focus 290 values designating planes further from the objective lens during image capture. For example, a focus value of −1 in an image object 230 would be toward the top surface of the tissue sample and a focus value of +1 in an image object 230 would be toward the bottom surface of the tissue sample.

As shown, the image object 230 includes a planar view 300. The planar view 300 has a zero focus value and an (X, Y) offset value relative to the image object 230. Once an image object has been retrieved, various planar views such as planar view 300 may be displayed to a user who provides offset and focus values (X, Y, and Z). The planar view 300 may be co-extensive with the height and width of the image object 230 or it may be n completely or partially interior area.

Figure 7B:
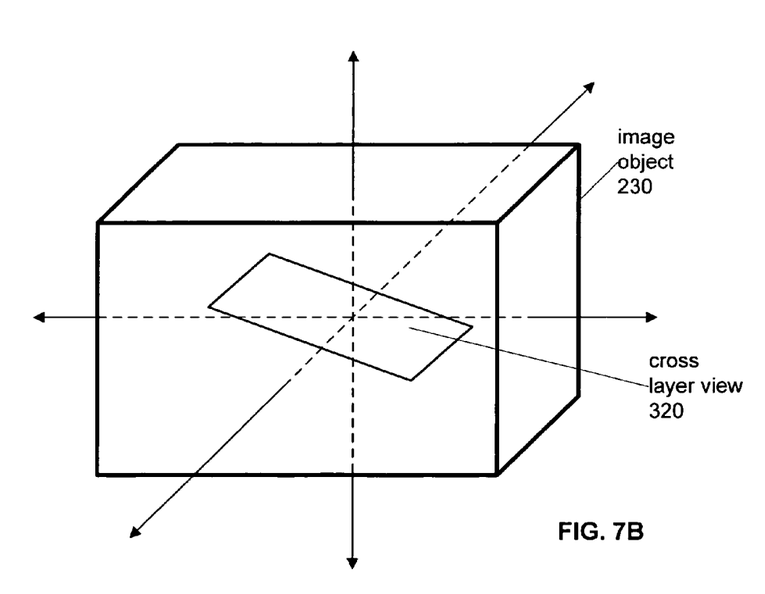
FIG. 7B is a block diagram illustrating an example image object and cross layer view according to an embodiment of the present invention.

FIG. 7B is a block diagram illustrating an example image object 230 and a cross layer view 320 according to an embodiment of the present invention. In the illustrated embodiment, the cross layer view 320 is planar, but is skewed against the horizontal z-planes (not shown) that comprise the image object 230. Advantageously, various orientations, rotations, flips, and the like can be obtained from the image object 230 as cross layer views 320. Note that regardless of the view orientation, there remains an axis that is perpendicular to the view. The illustrated view is referred to as a cross layer view because it extends across multiple z-planes.

In one embodiment, in order to construct a cross layer view (which is planar), imagery data from contiguous horizontal z-planes in the image object 230 at the appropriate height, width, and focus values are obtained and combined to form the cross layer view 320.

Figure 7C:
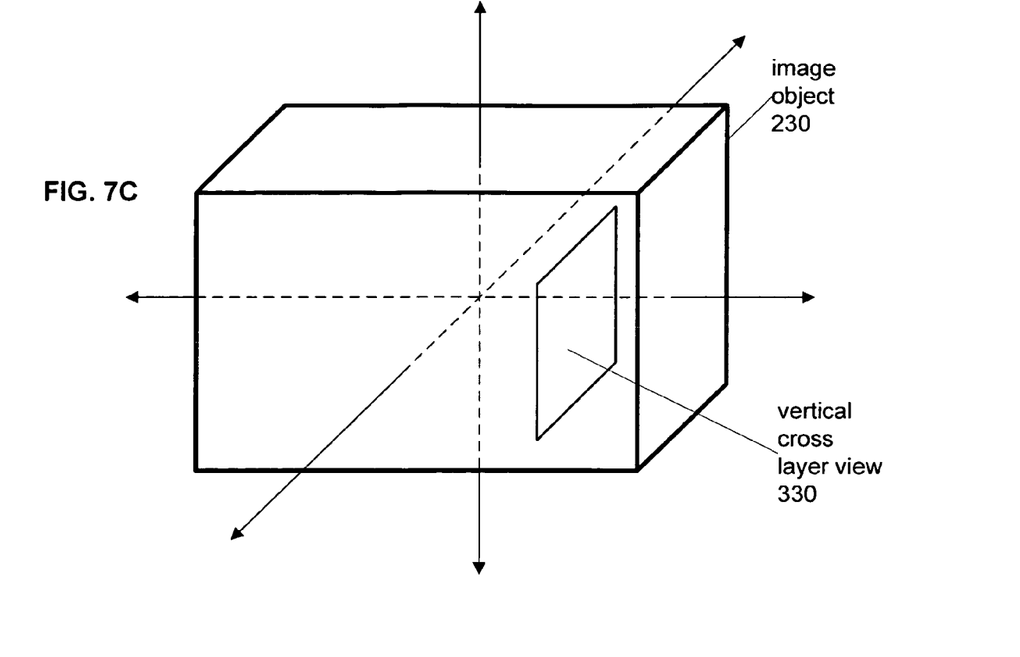
FIG. 7C is a block diagram illustrating an example image object and vertical cross layer view according to an embodiment of the present invention.

FIG. 7C is a block diagram illustrating an example image object 230 and a vertical cross layer view 330 according to an embodiment of the present invention. In the Illustrated embodiment, the vertical cross layer view 330 is similar to the cross layer view previously described in FIG. 7B except that it is orthogonal to the z-planes (not shown) that comprise the image object 230. Advantageously, arbitrary views such as vertical cross layer view 330 can be provided, which enables full 3D viewing, including orthogonal transformations (rotations and flips), side views, and other interesting skews and tilts, for example to provide a parallax effect. Although planar views that that have a view plane that is not perpendicular to the Z axis are more complicated to render, once the 3D image object has been obtained, any sort of planar view can be retrieved and displayed to a user.

Figure 7D:
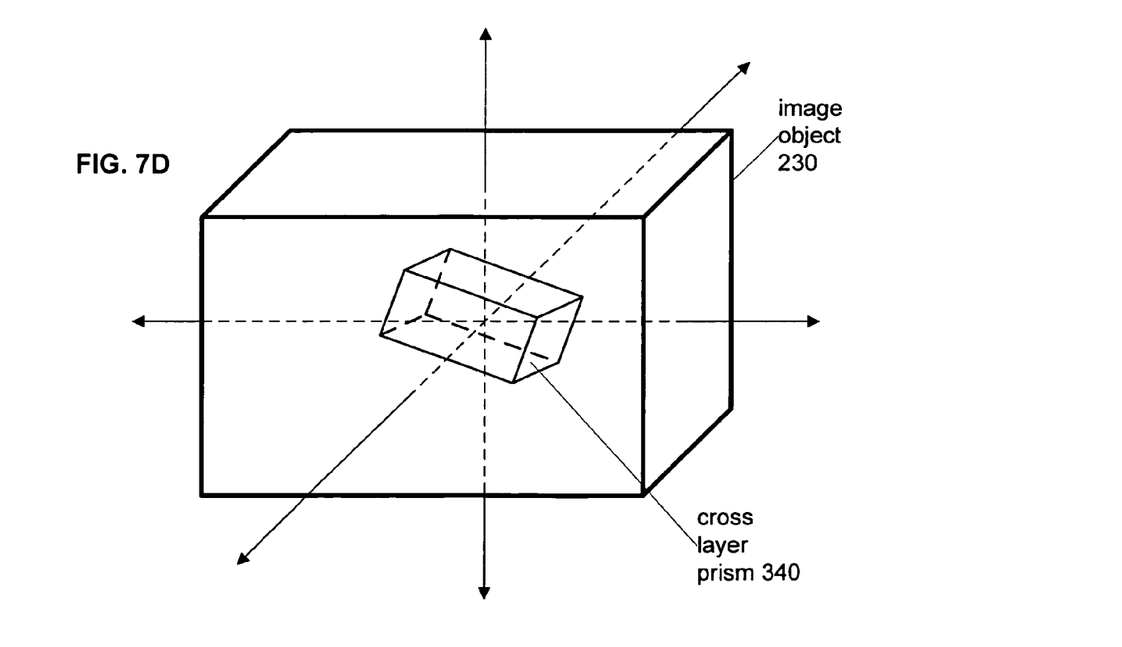
FIG. 7D is a block diagram illustrating an example image object and cross layer prism according to an embodiment of the present invention.

FIG. 7D is a block diagram illustrating an example image object 230 and cross layer prism 340 according to an embodiment of the present invention. As with planar views (recall that a view is a two dimensional region derived from the image object 230), prisms may also be derived from the image object 230. These prisms can be in line with the focus plane or they can be skewed. Cross layer prism 340 is an example of a skewed prism. As with the planar views all varieties, shapes, and sizes of prisms can be derived form the image object 230. In a simple embodiment, a prism may be a cube. In a more complex embodiment, a prism may be an irregular shaped 3D region within the image object 230 and, for example, be coextensive with a particular region of interest such as a single cell or cluster of cells. Additionally, once a prism has been identified and retrieved, in one embodiment views can be derived from the prism to provide vertical and horizontal and skewed cross sections of the prism to enable complete and thorough interrogation of the area of interest.

A prism such as cross layer prism 340 can be defined within the image object 230 by the height, width, and depth of two or more corners of the prism or by the height, width, and depth of a first corner and the height, width, and depth of the prism. Alternatively, an equation that defines the surface of the prism (e.g., if the surface is irregular or curved, etc.) can be employed to obtain the image data for the prism from the image object 230.

Figure 8:
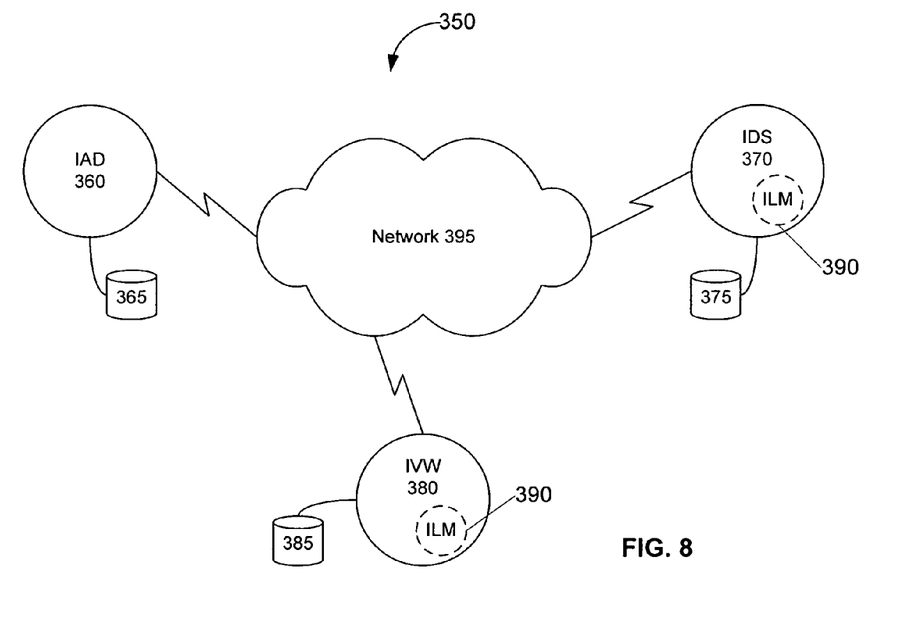
FIG. 8 is a block diagram illustrating an example networked system according to an embodiment of the present invention.

FIG. 8 is a block diagram illustrating an example networked system 350 according to an embodiment of the present invention. In the illustrated embodiment, the system 350 comprises an image acquisition device ("IAD") 360, an image data server ("IDS") 370, and an image viewing workstation ("IVW") 380. Each of these devices is associated with a respective data storage area 365, 375, and 385.

The IDS 370 and IVW 380 are each optionally configured with an image library module ("ILM") 390 that performs many of the functions related to obtaining, manipulating, and presenting views and prisms as described herein. The ILM 390 may be a programmed object, a hardware device or some combination of hardware and software. The IDS 370 may use the ILM 390 to access files in data storage area 375. The ILM 390 may also be implemented in combination such that a portion of its functionality resides and operates on the IVW 380 and a portion of its functionality resides and operates on the IDS 370. In one embodiment, all access to 3D virtual slide image data goes through the ILM 390.

To support 3D image objects and 3D virtual slides, the ILM 390 provides an interface (e.g., an API that extends a variety of features and functionality) to applications. The ILM 390 may be implemented as a software instance that can be incorporated into an application or as a service hosted on the IDS 520, for example. Preferably, the various features and functionality of the ILM 390 are encapsulated and provided in a well defined API. For example, images 3D virtual slide images have attributes that are determined at acquisition time and these attributes may be queried through the ILM 390.

The devices 360, 370, and 380 are communicatively coupled to each other via a network 395. Alternatively, the devices may be directly connected to each other or connected to each other via separate networks. In one embodiment, two or more of the devices may be modularly integrated into the same physical device, in which case the communication between functional modules may take place through inter-process communication, shared memory, common files or the like.

The IAD 360 comprises hardware and software which can acquire two-dimensional images from microscope slides. The IAD 360 may acquire images from the slide at any location within the slide (X,Y) and at any focal depth (Z).

The LAD 360 typically provides optics to magnify specimens on a microscope slide to resolutions required for medical diagnostics by Pathologists. The lowest resolution is typically 1.0 microns per pixel, (often called "10×") and the highest resolution may be 0.1 microns per pixel ("100×"). Typical resolutions are usually 0.5 microns per pixel ("20×") or 0.25 microns per pixel ("40×"). The numerical aperture ("NA") of the optics is typically 0.5 or 0.75, yielding a focal depth of 0.5 micron to 1 micron, allowing contiguous z-planes in tissue samples thicker than 1 and 2 microns, respectively.

Specimens on a microscope slide usually have an overall dimension of between 10 and 30 mm per side. For example, a typical sample could cover a region of 20×15 mm. Such a sample, when imaged fully at a resolution of 0.25 microns per pixel (i.e., 40×), yields an image that has 80,000×60,000 pixels. Accurately obtaining full slide images is technically difficult, but may be accomplished with instruments such as the Aperio ScanScope® that is described in detail in U.S. Pat. No. 6,711,283 (Soenksen), which is incorporated herein by reference in its entirety.

The IDS 370 comprises a server computer and software which stores and enables access to two- and three-dimensional images acquired by the IAD 360. The IDS 370 can be located near the LAD 360 on a local-area network 395. In an alternative embodiment it may be desirable for the IDS 370 to be remote from the IAD 360 and connected to viewing stations and other access devices via a wide-area network 395. The IDS 370 may include the ILM 390 as appropriate for delivery of the 3D virtual slide image data.

The IVW 380 comprises a personal computer and software which can display two and three dimensional images acquired by the IAD 360 and retrieved from the IDS 370. The IVW 380 may communicate across a local area network or wide area network 395 with the IAD 360 and IDS 370, using standard computer network technology such as TCP/IP. Image data captured at the IAD 360 may be stored in data storage area 365 or stored by the IDS 370 in data storage area 375. The image data may then be later viewed using an IVW 380. The IVW 380 may include the ILM 390 as appropriate for obtaining, manipulating, and viewing of the 3D virtual slide image data. An ILM 390 may be deployed both on the IVW 380 and the IDS 370 to provide 3D image data to a user at the IVW 380.

The network 395 may be a local area network, a wide area network, a wired or wireless network, or any combination of networks. On such combination of networks is commonly referred to as the Internet. Network 395 may be the Internet or any sub-combination of the networks that comprise the Internet. Network 395 may also be a private network or a public network or any combination of networks.

Figure 9:
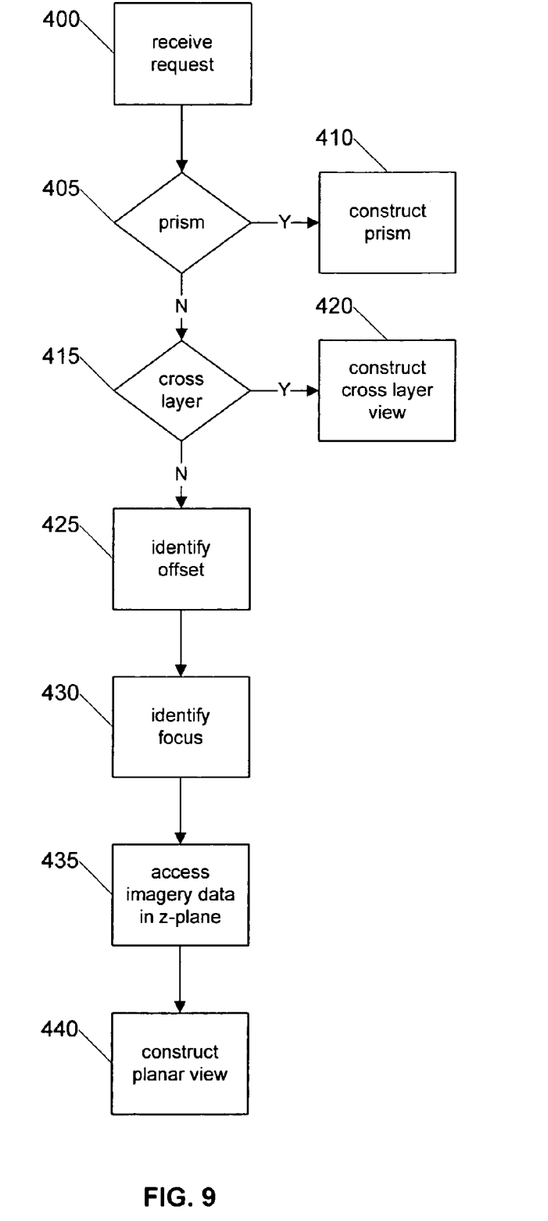
FIG. 9 is a flow diagram illustrating an example method for constructing a planar view from a three dimensional image object according to an embodiment of the present invention.

FIG. 9 is a flow diagram illustrating an example method for constructing a planar view from a three dimensional image object according to an embodiment of the present invention. In one embodiment, this method may be carried out on an image data server by an image library module, such as those previously described with respect to FIG. 8. Initially, in step 400, the ILM receives a request for a view. The request preferably provides certain demographic information about the requested view, for example the resolution of the image data and the offset and focus of the view along with the height and width of the view. Additional parameters about the view such as information to help sufficiently identify a view or prism may also be provided in the request, for example the type of image being requested (e.g., prism, cross layer view, standard view).

Figure 10:
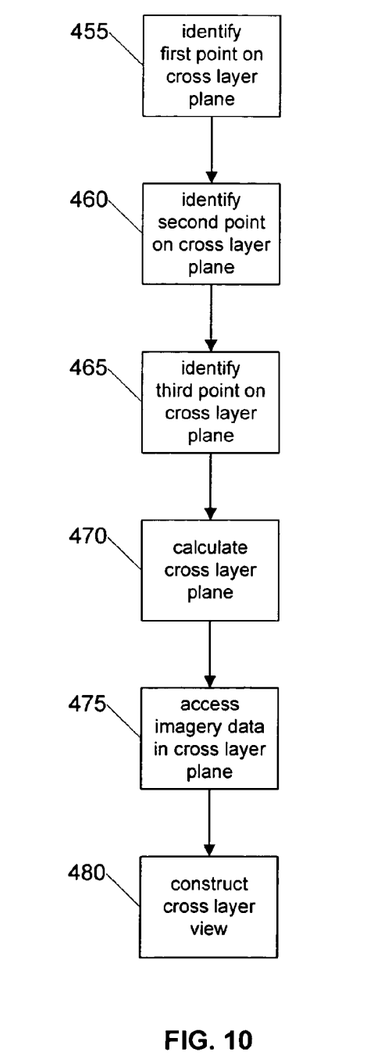
FIG. 10 is a flow diagram illustrating an example method for constructing a cross layer view from a three dimensional image object according to an embodiment of the present invention.
Figure 11:
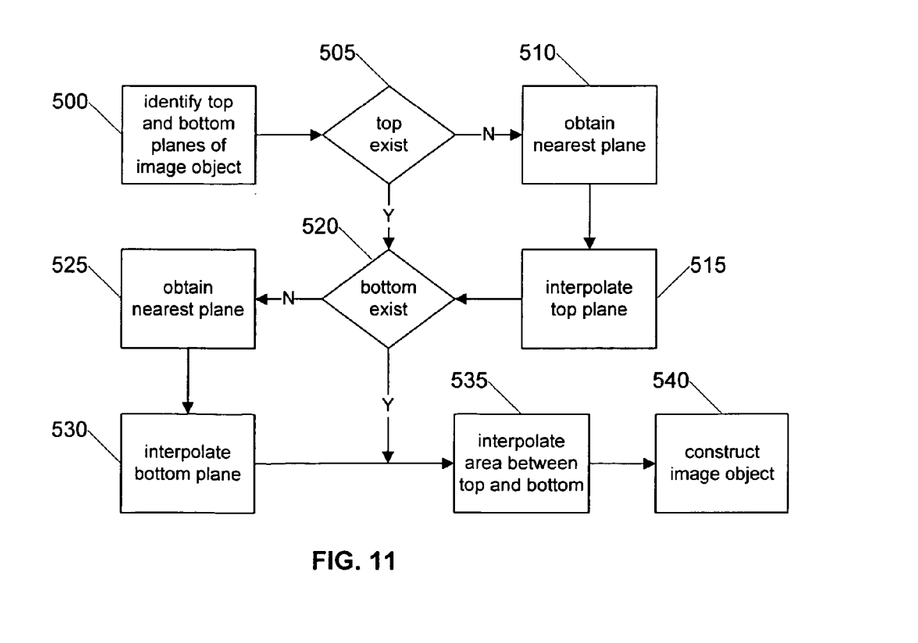
FIG. 11 is a flow diagram illustrating an example method for constructing an image object from a 3D virtual slide according to an embodiment of the present invention.

Once the identification information has been parsed out of the request, the ILM next determines whether the request is for a prism, as shown in step 405. If a prism has been requested, the ILM proceeds to step 410 where it constructs the prism. FIG. 11 (described later) provides a detailed method for constructing a prism. If the request is not for a prism, the ILM next determines in step 415 if the request is for a cross layer view. If a cross layer view has been requested, the ILM proceeds to step 420 where it constructs the cross layer view. FIG. 10 (described later) provides a detailed method for constructing a cross layer view.

If the request is not for a cross layer view, then in step 425 the ILM identifies the offset for the view and in step 430 the ILM identifies the focus for the view in step 430. Next, in step 435 the ILM accesses the imagery data in the identified z-plane and then in step 440 constructs the planar view, for example, using the offset and focus values in combination with the height and width values to crop the imagery data of the entire identified z-plane to just the requested view.

FIG. 10 is a flow diagram illustrating an example method for constructing a cross layer view from a three dimensional image object according to an embodiment of the present invention. In one embodiment, this method may be carried out on an image data server by an image library module, such as those previously described with respect to FIG. 8. Initially, in steps 455, 460, and 465, the ILM identifies first, second, and third points on the requested cross layer plane. These points may be identified by one of or a combination of the parameters included in the request. For example, the points may be derived based on the offset and the focus value for first, second, and third corners of the cross layer plane.

Next, in step 470, the ILM calculates the cross layer plane based on the three identified points. Once the cross layer plane has been calculated, in step 475 the ILM accesses the imagery data in the cross layer plane. In one embodiment, in order to access this imagery data, the ILM may have to access imagery data in a plurality of z-planes that are perpendicular to the Z axis. Alternatively, the ILM may be able to directly access the imagery data in the cross layer plane and then construct the cross layer view, as shown in step 480. In constructing the cross layer view, a portion of the imagery data for the complete cross layer plane in the image object may be discarded.

The above described method may also be used to construct a prism from an image object. For example, the top plane and the bottom plane of a prism can be identified according to the above method and then the imagery data in between those planes defines the requested prism. Accordingly, a cross layer prism or a more simple prism can be constructed.

Additionally, as will be understood by those skilled in the art, the general outline constructing a prism can also be employed to construct 3D views of other shapes such as spheres or irregular shapes. In this method, the surface of the desired 3D shape is first calculated within the image object and then the imagery data interior to the calculated surface is retrieved as the 3D view. In this description, the term prism is used primarily to mean regular 3D shapes with parallel opposing sides but it is also used intermittently to mean irregular shapes or spherical shapes or other 3D shapes from within an image object that can be retrieved and displayed as a 3D view. All such shapes are contemplated by the breadth of the present invention.

FIG. 11 is a flow diagram illustrating an example method for constructing an image object from a 3D virtual slide according to an embodiment of the present invention. In one embodiment, this method may be carried out on an image data server by an image library module, such as those previously described with respect to FIG. 8. Initially, in step 500 the ILM identifies the top and bottom surfaces of the image object. Next, in step 505 the ILM determines if the imagery data for the top plane exists in the 3D virtual slide or if it lies in an empty gap between scanned imagery data. If the top does not exist, as determined in step 505, then in step 510 the ILM obtains the nearest z-plane of image data and interpolates the imagery data for the top surface, as illustrated in step 515.

After obtaining the imagery data for the top surface (from scanned data or by interpolation), in step 520 the ILM next determines whether there is imagery data for the bottom plane in the 3D virtual slide or if the bottom plane lies in an empty gap between scanned imagery data. If the bottom does not exist, as determined in step 520, then in step 525 the ILM obtains the nearest z-plane of image data and interpolates the imagery data for the bottom surface in step 530. After obtaining the imagery data for the bottom surface (again, from scanned data or by interpolation), the ILM can construct the image object. Additional parameters used by the ILM to construct the image object may include the image object height, width, and depth.

The above describe method may also be employed to construct a prism from an image object that is not completely populated with contiguous image data. Accordingly, when constructing the prism, the image data for the top and bottom surfaces are either present in the image object or interpolated from image data that is present. Next, the image data between the top and bottom surfaces is filled in with data from the image object or interpolated data where necessary. In this fashion, a regular or cross layer prism may be constructed from an image object.

Figure 12:
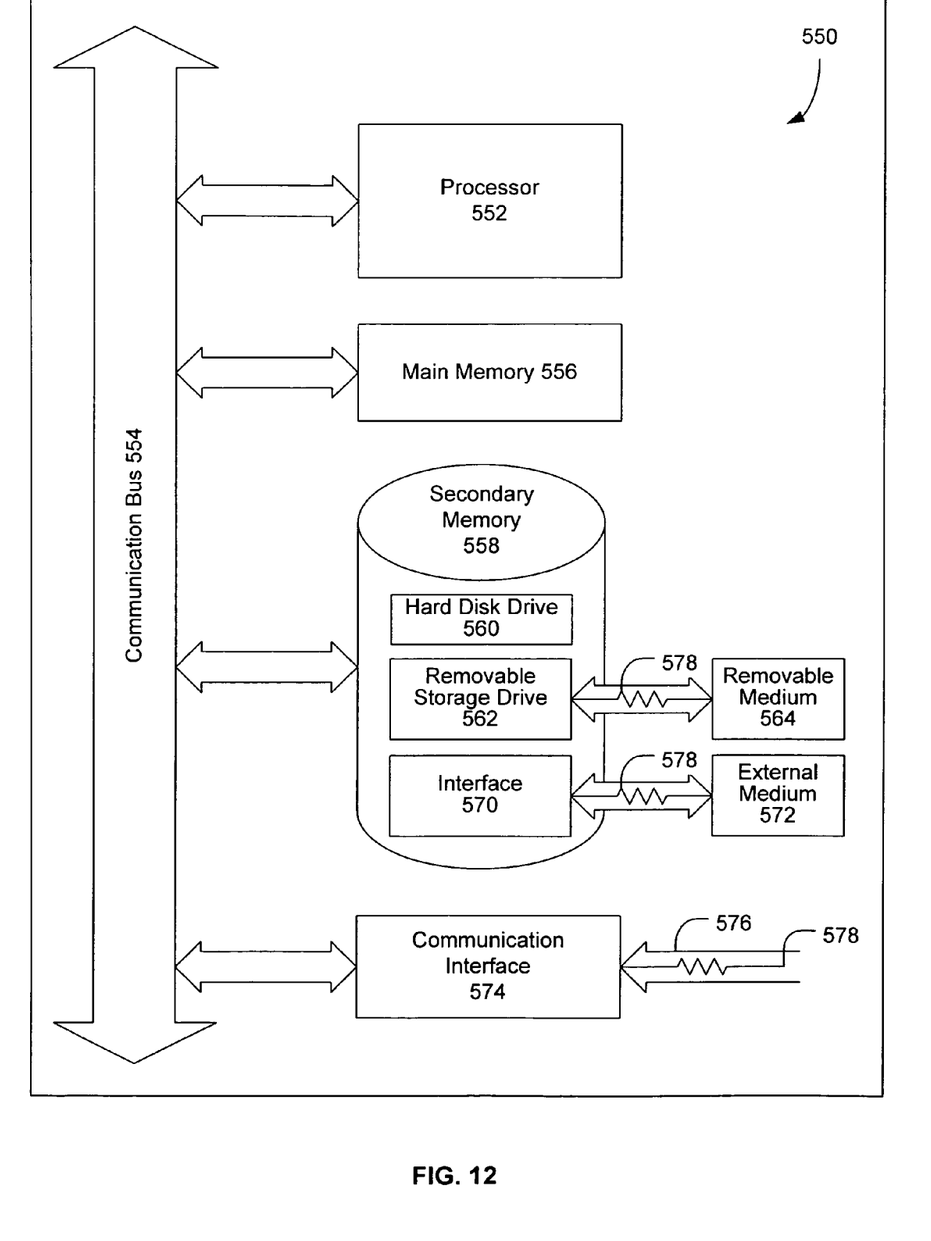
FIG. 12 is a block diagram illustrating an exemplary computer system as may be used in connection with various embodiments described herein.

FIG. 12 is a block diagram illustrating an exemplary computer system 550 that may be used in connection with the various embodiments described herein. For example, the computer system 550 may be used in conjunction with the IAD, IDS, or IVW devices previously described with respect to FIG. 11. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a DVD drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A system for providing three dimensional views of virtual slide information contained in a computer constructed image object, comprising:
　a computer constructed image object having a plurality of Z-planes comprising:
　　a bottom plane of scanned imagery data having an image thickness of one pixel;
　　a top plane of scanned imagery data having an image thickness of one pixel;
　　two or more planes of scanned imagery data between the top plane of scanned imagery data and the bottom plane of scanned imagery data, wherein the bottom plane of imagery data and a first of the two or more planes of scanned imagery data define a first imagery data free area between them, and wherein the top plane of imagery data and a second of the two or more planes of scanned imagery data define a second imagery data free area between them; and
　an image library module configured to access the computer constructed image object and provide a cross layer view of contiguous virtual slide information, wherein the cross layer view extends across at least two Z-planes, and wherein a focus value is obtained for each Z-plane and the focus values for each Z-plane are combined to form the cross layer view.

2. The system of claim 1, wherein the three dimensional view of contiguous virtual slide information comprises scanned imagery data and interpolated imagery data.

3. The system of claim 2, wherein the interpolated imagery data of the three dimensional view of contiguous virtual slide information is located in the first imagery data free area.

4. The system of claim 2, wherein the interpolated imagery data of the three dimensional view of contiguous virtual slide information is located in the second imagery data free area.

5. The system of claim 1, wherein the library module is further configured to interpolate image information between the bottom plane of imagery data and the first of the two or more planes of scanned imagery data.

6. The system of claim 1, wherein the library module is further configured to interpolate image information between the top plane of imagery data and the second of the two or more planes of scanned imagery data.

7. A computer implemented method for constructing a three dimensional view of virtual slide imagery data from a portion of an image object including scanned image data from a plurality of image planes and interpolated image data between the scanned image planes, where one or more processors are programmed to perform the steps comprising:
　identifying a first point in an image object having a first height, a first width, and a first focus value;
　identifying a second point in the image object having a second height, a second width, and a second focus value;
　identifying a third point in the image object having a third height, a third width, and a third focus value;
　constructing a first plane in the image object from said first, second, and third points; and
　providing a cross layer view from said first plane, wherein the cross layer view extends across at least two Z-planes, and wherein a focus value is obtained for each Z-plane and the focus values for each Z-plane are combined to form the cross layer view.

8. A non-transitory computer readable medium having stored thereon one or more sequences of instructions for causing one or more microprocessors to perform the steps for constructing a three dimensional view of virtual slide imagery data from a portion of an image object including scanned image data from a plurality of image planes and interpolated image data between the scanned image planes, the steps comprising:
　identifying a first point in an image object having a first height, a first width, and a first focus value;
　identifying a second point in the image object having a second height, a second width, and a second focus value;
　identifying a third point in the image object having a third height, a third width, and a third focus value;
　constructing a first plane in the image object from said first, second, and third points; and
　providing a cross layer view from said first plane, wherein the cross layer view extends across at least two Z-planes, and wherein a focus value is obtained for each Z-plane and the focus values for each Z-plane are combined to form the cross layer view.

9. The system of claim 1 wherein the image library module is further configured to access the computer constructed image object and provide a cross layer prism of contiguous virtual slide information, wherein the cross layer prism extends across at least two Z-planes.

* * * * *